United States Patent [19]

Hakamatsuka et al.

[11] Patent Number: 5,322,675
[45] Date of Patent: Jun. 21, 1994

[54] METHOD OF PREPARING CALCIUM PHOSPHATE

[75] Inventors: Yasuharu Hakamatsuka; Hiroyuki Irie, both of Tokyo; Sukezo Kawamura, Inuyama; Motohiro Toriyama, Kasugai, all of Japan

[73] Assignees: Director-General of Agency of Industrial Science and Technology; Olympus Optical Co., Ltd., both of Tokyo, Japan

[21] Appl. No.: 4,777

[22] Filed: Jan. 14, 1993

Related U.S. Application Data

[63] Continuation of Ser. No. 786,507, Nov. 1, 1991, abandoned.

[51] Int. Cl.$^5$ .............................................. C01B 25/32
[52] U.S. Cl. ..................................... 423/311; 423/308
[58] Field of Search ........................ 423/308, 309, 311

[56] References Cited

U.S. PATENT DOCUMENTS

| | | | |
|---|---|---|---|
| 4,717,556 | 1/1988 | Kawamura et al. | 423/311 |
| 4,880,610 | 11/1989 | Constantz | 423/309 |
| 5,047,031 | 9/1991 | Constantz | 423/325 |
| 5,053,212 | 10/1991 | Constantz et al. | 423/305 |

Primary Examiner—Wayne Langel
Attorney, Agent, or Firm—Frishauf, Holtz, Goodman & Woodward

[57] ABSTRACT

Powdery calcium carbonate and a powdery dihydrate of calcium monohydrogenohosphate are weighed to get a Ca/P ratio of 1.45 to 1.67. The powdery mixture thus prepared is then added pure water at a temperature of 30° C. or higher to obtain an aqueous slurry having a concentration of about 10% by weight. Thereafter, the aqueous slurry is subjected to a rotational attrition by using a ball mill to conduct a mechanochemical reaction of the calcium carbonate with the dihydrate of calcium monohydrogenphosphate. The slurry is then dried completely at 80° C., followed by pulverization to yield a dry powder of calcium phosphate hydrate. The dry powder is calcinated at a temperature ranging from 720° to 1,150° C. for 1-10 hours or more to give calcium phosphate powder, which is molded in a desired shape and is sintered at a certain temperature to obtain a sintered body of calcium phosphate. The calcium phosphate and the sintered body thereof, thus prepared, have an assured biological safety in that the calcium phosphate is free from hemolysis, antigenicity and cytotoxicity.

20 Claims, No Drawings

METHOD OF PREPARING CALCIUM PHOSPHATE

This application is a continuation of U.S. patent application Ser. No. 07/786,507, filed Nov. 1, 1991, abandoned.

BACKGROUND OF THE INVENTION

1. Field of the Invention

The present invention relates to a method of preparing calcium phosphate which is utilized as a raw material for bioceramics such as bone supplement material, an artificial tooth root, an artificial joint, bone pin, a percutaneous terminal and artificial an bone, etc. Particularly the present invention relates to a method of preparing calcium phosphate which is biologically safe and free from hemolysis, etc.

2. Description of the Related Art

Recently research and developments have been flourishing with respect to bioactive calcium phosphate which is used for bone supplement material, an artificial tooth root, etc.

There have been known such conventional methods of preparing calcium phosphate, such as a dry synthesis wherein a powdery raw material is subjected to a solid phase reaction under an elevated temperature, and a wet synthesis wherein raw material solutions and/or a raw material slurry are reacted. Any of these methods, however, has hardly been able to provide a product of high purity. Furthermore, the production of high-purity calcium phosphate by said conventional methods has resulted not only in complicated processes but also high costs.

As a method to overcome the above stated problems, a method of preparing $\beta$-tricalcium phosphate (referred to as $\beta$-TCP hereafter) powder through a so-called wet attrition synthesis utilizing a mechanochemical reaction, has been disclosed in e.g. U.S. Pat. No. 4,717,556, which is a method capable of producing high-purity calcium phosphate in a simple and economical way.

Some of the embodiments of the above mentioned U.S. Pat. No. 4,717,556 have disclosed two cases of preparation of $\beta$-TCP in which prepared $\beta$-TCP has an atomic ratio of calcium atom relative to a phosphorus atom (referred to as Ca/P atomic ratio hereafter) of 1.5 or 1.67, respectively. Also there have been descriptions that said methods can provide powdery $\beta$-TCP having a large specific surface area.

However, in said U.S. Pat. No. 4,717,556 the biological safety of thus synthesized $\beta$-TCP and hydroxylapatite (HAP) has not been examined sufficiently. Namely U.S. Pat. No. 4,717,556 as mentioned above describes that by adjusting the Ca/P atomic ratio to 1.5 of the raw materials and a calcination temperature to 750° C. the calcium phosphate can be produced in an economical and industrially practicable way. But there is also a description that the calcination time depends on an X-ray diffraction strength of dried powder of $\beta$-TCP hydrate of pre-calcination. Also there is stated that the crystallinity of powder of dried $\beta$-TCP of post-calcination changes depending on the calcination time. More specifically, in said U.S. Pat. No. 4,717,556 there is disclosed that when dry powder of $\beta$-TCP hydrate is calcinated at a temperature of 750° C. or more, the diffraction strength will be increased. Furthermore, it is generally known that, when the calcination temperature is 1,150° C. or more, a transition from $\beta$-TCP to $\alpha$-TCP may occur resulting in a change of crystallinity of the obtained $\beta$-TCP.

As stated above, there are instances where high purity powdery calcium phosphate having a desired crystallinity cannot be produced by the mechanochemical method in accordance with said U.S. Pat. No. 4,717,556. The purity of the powder depends on the calcination time and temperature. Furthermore the powdery calcium phosphate thus obtained is apt to contain non-reacted matter like $Ca(OH)_2$ etc., which will cause hemolysis. Consequently, the produced calcium phosphate powder may show a hemolytic property occasionally.

Calcium phosphate type ceramics have been known to have not only hemolysis but also an antigenicity.

Still further, ceramics such as TCP and HAP, etc., have been known to show a cytotoxicity. An intensity of the cytotoxicity is confirmed to be different depending on, for instance, a kind of preparation method (e.g., dry or wet method) and calcination temperature.

As described above, calcium phosphate prepared in accordance with said U.S. Pat. No. 4,717,556 may cause hemolysis, antigenicity and cytotoxicity, which have drawbacks in the view point of biological safety. Thus it is not preferable to use such calcium phosphate as a biomaterial.

SUMMARY OF THE INVENTION

Therefore the object of the present invention is to provide a method of preparing calcium phosphate having an assured biological safety free from hemolysis, anti-genicity and cytotoxicity, in a powder form.

Another object of the present invention is to provide a method of preparing a sintered body of calcium phosphate comprising said calcium phosphate powder, which is provided with an assured biological safety.

Thus, the present inventive is a method of preparing calcium phosphate comprising:

a step of weighing powdery calcium carbonate with powdery calcium hydrogenphosphate or a dihydrate thereof in a certain Ca/P ratio, followed by an addition of pure water to obtain aqueous slurry having a concentration of about 10% by weight;

a step of subjecting the aqueous slurry to a rotational attrition by using a ball mill to carry out a mechanochemical reaction of the calcium carbonate with the calcium hydrogenphosphate or a dihydrate thereof;

a step of drying the aqueous slurry, thus mechanochemically reacted, completely at 80° C., followed by a pulverization to obtain a powdery substance; and a step of calcinating the powder substance at a certain temperature to give calcium phosphate.

Further, the present inventive is a method of preparing a sintered body of calcium phosphate comprising:

a step of weighing calcium carbonate powder with powdery calcium hydrogenphosphate or a powdery dihydrate thereof in a certain Ca/P ratio, followed by an addition of pure water to obtain aqueous slurry having a concentration of about 10% by weight;

a step of subjecting the aqueous slurry to a rotational attrition by using a ball mill to carry out a mechanochemical reaction of the calcium carbonate with the calcium hydrogenphosphate or a dihydrate thereof;

a step of drying the aqueous slurry, thus mechanochemically reacted, completely at 80° C., followed by a pulverization to obtain a powdery substance;

a step of calcinating the powdery substance at a certain temperature to give calcium phosphate; and a step of molding the calcium phosphate into a desired shape and then sintering at a certain temperature to obtain a sintered body of calcium phosphate. Herein Ca/P ratio means a molar ratio of calcium relative to phosphorus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

It is preferable that calcium carbonate powder which have a particle diameter of not larger than 0.5 μm and a high purity to be used as a starting material in the present invention. Calcium carbonate powder as described above and calcium hydrogenphosphate powder or a dihydrate powder thereof are weighed respectively to get a predetermined Ca/P ratio. For instance, in case of the final product of TCP, $Ca_3(PO_4)_2$, 0.05 mol of calcium carbonate powder and 0.1 mol of powdery calcium hydrogenphosphate or a powdery dihydrate thereof are weighed respectively so as to get a Ca/P ratio of 1.5. To a powdery mixture of thus weighed, pure water of which temperature is preferably not lower than 30° C. is added, thereby preparing aqueous slurry which contain solid phase with a concentration of about 10% by weight.

Then thus prepared aqueous slurry is subjected to a rotational attrition by using a ball mill to carry out a mechanochemical reaction of powdery calcium phosphate with powdery calcium hydrogenphosphate or powdery dihydrate thereof for preferably 24 hours.

Thereafter the aqueous slurry treated as described above is dried at e.g. 80° C. for preferably 8 hours or more. After the aqueous slurry is completely dried it is pulverized to obtain a dry powder of calcium phosphate hydrate.

Then the dry powder of calcium phosphate hydrate is calcinated at a certain temperature, preferably from 720° to 1,150° C. to yield calcium phosphate powder. In this calcinating, a calcination time depends on the calcination temperature. Namely, the higher the calcination temperature is, the shorter becomes the required calcination time, the lower the calcination temperature is, the longer the required calcinating time. When the calcination temperature is from 720° to 1,150° C., the calcination time required is desirably for 1–10 hours or more.

Further the calcium phosphate powder is molded into a desired shape, which is then subjected to a sintering at a certain temperature to give a sintered body of calcium phosphate. Herein, the sinter body e.g. a porous body or a dense body.

As has been described heretofore, the calcium phosphate powder and a sintered body thereof prepared in accordance with the present invention seldom show hemolysis, antigenicity and cytotoxicity, leading to an assured biological safety.

EXAMPLE 1

Preparation of β-tricalcium phosphate 0.05 mol of powdery calcium carbonate ($CaCO_3$) having a purity of 99.99% and a particle diameter of 0.5 μm or less, and 0.1 mol of powdery dihydrate of calcium hydrogenphosphate ($CaHPO_4.2H_2O$) i.e., calcium monohydrogenphosphate with a purity of 99% or higher were respectively weighed. To a powdery mixture of these compounds, 200 ml of pure water, of which temperature was 30° C., was added to obtain aqueous slurry which contain solid phase with a concentration of about 10% by weight.

The obtained aqueous slurry was put in a pot mill together with a zirconia ball and was subjected to a rotational attrition at 120 r.p.m. for 24 hours to conduct a mechanochemical reaction between the powdery calcium carbonate and the powdery dihydrate of calcium hydrogenphosphate.

After the reaction, the aqueous slurry was transferred onto a stainless steel tray and was dried at 80° C. for 8 hours or more. The solid resultant thus dried was pulverized to obtain a powdery substance.

Then the powdery substance was put in a high-purity alumina box and was subjected to a calcination under conditions shown in Table 1 (temperature and time) to yield powdery calcium phosphate compound.

The powdery calcium phosphate compound was molded by pressing with a hydrate press for molding of ceramics to obtain a molded body of calcium phosphate, which was then sintered at a temperature of 1000°–1150° C. to give a sintered body of calcium phosphate. Various kinds of the sintered body ranging from a porous body to a dense body can be prepared by changing the production conditions such as a sintering temperature appropriately.

Calcium phosphate compounds prepared under various conditions as stated above were examined in their hemolysis and cytotoxicity.

In this examination, hemolysis was evaluated according as the method described in "Hemolysis Test by Federation Dental International (FDI) Standard" in the following way. To 10 g of the calcium phosphate compound specimen, 100 ml of physiological saline solution was added and the resultant mixture was heat-treated at 121° C. for 60 minutes in an autoclave, thereby obtaining a test solution. 0.2 ml of heparin blood was added to 10 ml of the test solution (A), 10 ml of physiological saline solution (B) and 10 ml of pure water (C), respectively, and a mixture thus obtained and allowed to be left at 37° C. for 60 minutes. Thereafter, the treated liquids prepared from (A), (B) and (C) were centrifugalized at 3,000 r.p.m for 10 minutes, then supernatant liquids (A), (B) and (C) were collected respectively. Absorbance of the supernatants (A), (B) and (C) at 545 nm were measured by using a spectrophotometer. From the value of the absorbance (A), (B) and (C) measured above and by using the following formula (1), a value (D) was calculated.

$$(D) = \frac{(A) - (B)}{(C)} \times 100 \quad (1)$$

It was judged that a calcium phosphate compound of which the value (D) calculated as described above was 50 or more has hemolysis.

Also cytotoxicity was evaluated in such a manner that: fibroblast V-79 originating from a Chinese hamster was diluted by a medium. The medium containing the fibroblast was poured into plastic cultivation Petri dishes into which calcium phosphate compound formed in a disc shape was put. The Petri dishes were subjected to cultivation in an incubator kept at 37° C. and 5% $CO_2$ for 8 days. Then the colony formed therein was observed in its size to evaluate the colony forming ability.

Test results thus obtained are shown in Table 1.

TABLE 1

| CALCINATION CONDITIONS | | HEMO-LYSIS | CYTOTOXICITY (COLONY FORMING ABILITY) | NOTES |
|---|---|---|---|---|
| TEMP. | TIME (HOURS) | | | |
| 720° C. | 1 | ++ | A LITTLE | |
| | 2 | ++ | A LITTLE | |
| | 3 | ++ | A LITTLE | |
| | 5 | ++ | A LITTLE RATHER | |
| | 8 | + | A LITTLE | |
| | 10 | − | GOOD | NO ANTIGENICITY |
| 900° C. | 1 | ++ | A LITTLE RATHER | |
| | 6 | + | A LITTLE | |
| | 8 | − | GOOD | NO ANTIGENICITY |
| 1000° C. | 1 | ++ | A LITTLE | |
| | 3 | − | GOOD | NO ANTIGENICITY |
| 1150° C. | 1 | − | GOOD | NO ANTIGENICITY |

++: HEMOLYTIC
+: SLIGHTLY HEMOLYTIC
−: NO HEMOLYTIC

As shown in Table 1, the shorter the calcination time is and the lower the calcination temperature is, the higher becomes the hemolysis as well as cytotoxicity of the produced calcium phosphate compound. Whereas, the longer the calcination time is and the higher the calcination temperature is, the less becomes hemolysis as well as cellular deformation. From the results, such combinations of the calcination temperature and time as 720° C.-10 hours, 900° C.-8 hours, 1,000° C.-3 hours and 1,150° C.-1 hour were confirmed to result in no hemolysis as well as no cytotoxicity of the produced calcium phosphate compound.

Also, calcium phosphate compounds which show no hemolysis in the above hemolysis test, were examined in their antigenicity. The antigenicity was evaluated according to a maximization test using guinea-pig. Meanwhile the maximization test has been commonly carried out as an evaluation method of antigenicity of drugs for external use. The results of this test showed that the calcium phosphate compounds of no hemolysis were not antigenic, which is also shown in Table 1.

As is clear form the test result, with a calcination temperature ranging from 720° to 1,150° C. and with a calcination time ranging from 1 to 10 hours or more, calcination of the powder substance obtained by a mechanochemical reaction as stated above is found to produce calcium phosphate compounds free from hemolysis, antigenicity and cytotoxicity, i.e., provided with an assured biological safety. Needless to say, it is preferable that when the calcination temperature is lower the calcination time will be longer. Comparative Example 1

As a comparative example, preparation of calcium phosphate according to the dry synthesis method will be explained below.

First, β-Calcium pyrophosphate and calcium carbonate were mixed together in a molar ratio of 1:1. The resultant mixture was calcinated at 1,000° C. for 2 hours to yield β-TCP, which was press-molded and sintered at 1,150° C. for 3 hours to obtain a sintered body.

The sintered body was examined in its hemolysis and cytotoxicity in the same way as in Example 1. From this results, β-TCP prepared by the conventional dry synthesis was confirmed to be hemolytic and cytotoxic so that it is inapplicable as a biomaterial.

EXAMPLE 2

In this example, preparations of calcium phosphate by changing the temperature of pure water which was used for preparation of an aqueous slurry will be explained below.

Calcium phosphate compounds were prepared in the same manner as in Example 1 except that the temperature of pure water to be used for preparation of an aqueous slurry was changed as shown in Table 2. Herein, calcination temperature and time in this experiment were set at 720° C. for 10 hours in every case.

The calcium phosphate compounds preparing as described above were respectively examined in their hemolysis, antigenicity and cytotoxicity in the same way as in Example 1. This results are shown in Table 2.

TABLE 2

| TEMP. OF PURE WATER | HEMOLYSIS | CYTOTOXICITY | NOTES |
|---|---|---|---|
| 10° C. | ++ | A LITTLE | |
| 20 | + | A LITTLE | |
| 25 | + | A LITTLE | |
| 30 | − | GOOD | NO ANTIGENICITY |
| 35 | − | GOOD | NO ANTIGENICITY |
| 40 | − | GOOD | NO ANTIGENICITY |
| 60 | − | GOOD | NO ANTIGENICITY |

++: HEMOLYTIC
+: SLIGHTLY HEMOLYTIC
−: NO HEMOLYTIC

As Shown in Table 2, calcium phosphate compound prepared with pure water of 10° C. showed hemolysis and antigenicity, while those prepared with pure water of 20° C. and 25° C. were respectively found to be slightly hemolytic and antigenic. Whereas none of calcium phosphate compounds prepared with pure water of 30° C. or higher showed hemolysis, antigenicity and cytotoxicity.

Thus, the above test results prove that the aqueous slurry prepared by using pure water of 30° C. or higher can lead to a production of calcium phosphate compound with an assured biological safety and free from hemolysis, antigenicity and cytotoxicity. The reason for this may be that: the aqueous slurry can be mixed homogeneously with pure water of a higher temperature, which may result in a preparation of calcium phosphate compound having a more homogeneous composition.

EXAMPLE 3

In this example, preparation of calcium phosphate by changing the molar ratio to be mixed of calcium carbonate and dihydrate of calcium hydrogenphosphate as the starting materials, i.e., Ca/P ratio of the productant calcium phosphate. Calcium phosphate compounds were prepared in the same manner as in Example 1 except that the molar ratio of calcium carbonate relative to dihydrate of calcium hydrogenphosphate was changed so as to obtain Ca/P ratio of the productant calcium phosphate, which is shown in Table 3. In every case, the production conditions were set up as following; the temperature of pure water to be used for preparation of the above explained aqueous slurry was 30° C., the calcination temperature was 720° C. and the calcination time was 10 hours.

Calcium phosphate compounds thus prepared were examined in their hemolysis, antigenicity and cytotoxicity in the same way as in Example 1, this results are shown in Table 3.

TABLE 3

| Ca/P RATIO | HEMOLYSIS | CYTOTOX-ICITY | NO ANTIGEN ANTIGENICITY |
|---|---|---|---|
| 1.45 | — | GOOD | — |
| 1.50 | — | GOOD | — |
| 1.53 | — | GOOD | — |
| 1.57 | — | GOOD | — |
| 1.67 | — | GOOD | — |

—: NO HEMOLYTIC OR NO ANTIGENIC

As shown in Table 3, none of calcium phosphate compounds show hemolysis, antigenicity and cytotoxicity.

As described above, it is confirmed that when calcium phosphate compounds are prepared in accordance with the present inventive method, i.e., the calcination temperature ranging from 750° to 1,150° C., the calcination time for 10 hours or more with the temperature of pure water of 30° C., the calcium phosphate compounds provided with an assured biological safety and free from hemolysis, antigenicity and cytotoxicity can be obtained even if the Ca/P ratio of the calcium phosphate compounds should vary, in other words any kind of calcium phosphate compounds such as HAP and TCP, etc., may be prepared.

Additional advantages and modifications will readily occur to those skilled in the art. Therefore, the invention in its broader aspects is not limited to the specific details, and illustrated examples shown and described herein. Accordingly, various modifications may be without departing from the spirit or scope of the general inventive concept as defined by the appended claims and their equivalents.

What is claimed is:

1. A method of preparing calcium phosphate comprising:
   (a) weighing powdery materials comprising powdery calcium carbonate and powdery calcium monohydrogenphosphate or a powdery dihydrate thereof such that a Ca/P ratio of the powdery materials is 1.45 to 1.67;
   (b) adding water at a temperature of not lower than 30° C. to the weighed powdery materials from step (a) to prepare an aqueous slurry containing about 10% by weight of the powdery materials;
   (c) subjecting the aqueous slurry to a rotational attrition by using a ball mill to carry out a mechanochemical reaction of said calcium carbonate with said calcium monohydrogenphosphate or a dehydrate thereof;
   (d) drying the aqueous slurry, thus mechanochemically reacted, at 80° C.;
   (e) pulverizing the dried slurry to obtain a powdery substance; and
   (f) calcining the powdery substance under conditions of calcination temperature and calcination period of time to obtain a biologically safe calcium phosphate free from all of hemolysis, antigenicity and cytotoxicity, said calcining being carried out at a calcination temperature of 720° to 1,150° C. for a calcination period of time of 1 to 10 hours, said calcining being carried out for a calcination period of time of at least one hour when said calcining is carried out at 1,150° C. and the calcination period of time being related to the calcination temperature such that the calcination period of time is increased with a decrease in said calcination temperature, said calcining being carried out for a calcination period of time of at least 3 hours when said calcining is carried out 1000° C., said calcining being carried out for a calcination period of time of at least 8 hours when said calcining is carried out at 900° C. and said calcining being carried out for a calcination period of time of at least 10 hours when said calcining is carried out at 720° C.

2. The method according to claim 1, wherein said powdery calcium carbonate has a particle diameter of not more than 0.5 μm.

3. The method according to claim 2, wherein the Ca/P ratio is 1.5.

4. The method according to claim 3, wherein step (c) is carried out for 24 hours and step (d) is carried out for 8 hours.

5. The method according to claim 1, wherein the water is at a temperature of 30° to 50° C.

6. The method according to claim 1, wherein the calcining is carried out at 1150° C. for one hour.

7. The method according to claim 1, wherein the calcining is carried out at 1000° C. for three hours.

8. The method according to claim 1, wherein the calcining is carried out at 900° C. for eight hours.

9. The method according to claim 1, wherein the calcining is carried out at 720° C. for ten hours.

10. A method of preparing a sintered body of calcium phosphate comprising:
   (a) weighing powdery materials comprising powdery calcium carbonate and powdery calcium monohydrogenphosphate or a powdery dihydrate thereof such that a Ca/P ratio of the powdery materials is 1.45 to 1.67;
   (b) adding water at a temperature of not lower than 30° C. to the weighed powdery materials from step (a) to prepare an aqueous slurry containing about 10% by weight of the powdery materials;
   (c) subjecting the aqueous slurry to a rotational attrition by using a ball mill to carry out a mechanochemical reaction of said calcium carbonate with said calcium monohydrogenphosphate or a dehydrate thereof;
   (d) drying the aqueous slurry, thus mechanochemically reacted, at 80° C.;
   (e) pulverizing the dried slurry to obtain a powdery substance;
   (f) calcining the powdery substance under conditions of calcination temperature and calcination period of time to obtain a biologically safe calcium phosphate free from all of hemolysis, antigenicity and cytotoxicity, said calcining being carried out at a calcination temperature of 720° to 1,150° C. for a calcination period of time of 1 to 10 hours, said calcining being carried out for a calcination period of time of at least one hour when said calcining is carried out at 1,150° C. and the calcination period of time being related to the calcination temperature such that the period of time is increased with a decrease in said calcination temperature, said calcining being carried out for a calcination period of time of at least 3 hours when said calcining is carried out 1000° C., said calcining being carried out for a calcination period of time of at least 8 hours when said calcining is carried out at 900° C. and said calcining being carried out for a calcination period of time of at least 10 hours when said calcining is carried out at 720° c.;

(g) molding the calcium phosphate into a desired shape, and (h) sintering the molded calcium phosphate to obtain a sintered body of the calcium phosphate.

11. The method according to claim 10, wherein said powdery calcium carbonate has a particle diameter of not more than 0.5 μm.

12. The method according to claim 11, wherein the Ca/P ratio is 1.5.

13. The method according to claim 12, wherein step (c) is carried out for 24 hours and step (d) is carried out for 8 hours.

14. The method according to claim 10, wherein the water is at a temperature of 30° to 50° C.

15. A method of preparing calcium phosphate comprising:

(a) weighing powdery materials comprising powdery calcium carbonate and powdery calcium monohydrogenphosphate or a powdery dihydrate thereof such that a Ca/P ratio of the powdery materials is 1.45 to 1.67;

(b) adding water at a temperature of not lower than 30° C. to the weighed powdery materials from step (a) to prepare an aqueous slurry containing the powdery materials;

(c) subjecting the aqueous slurry to a rotational attrition by using a ball mill to carry out a mechanochemical reaction of said calcium carbonate with said calcium monohydrogenphosphate or a dehydrate thereof;

(d) drying the aqueous slurry, thus mechanochemically reacted;

(e) pulverizing the dried slurry to obtain a powdery substance; and (f) calcining the powdery substance under conditions of calcination temperature and calcination period of time to obtain a biologically safe calcium phosphate free from all of hemolysis, antigenicity and cytotoxicity, said calcining being carried out at a calcination temperature of 720° to 1,150° C. for a calcination period of time of 1 to 10 hours, said calcining being carried out for a calcination period of time of at least one hour when said calcining is carried out at 1,150° C. and the calcination period of time being related to the calcination temperature such that the calcination period of time is increased with a decrease in said calcination temperature, said calcining being carried out for a calcination period of time of at least 3 hours when said calcining is carried out 1000° C., said calcining being carried out for a calcination period of time of at least 8 hours when said calcining is carried out at 900° C. and said calcining being carried out for a calcination period of time of at least 10 hours when said calcining is carried out at 720° C.

16. The method according to claim 15, wherein said powdery calcium carbonate has a particle diameter of not more than 0.5 μm.

17. The method according to claim 15, wherein the aqueous slurry contains about 10% by weight of the powdery materials.

18. A method of preparing a sintered body of calcium phosphate comprising:

(a) weighing powdery materials comprising powdery calcium carbonate and powdery calcium monohydrogenphosphate or a powdery dihydrate thereof such that a Ca/P ratio of the powdery materials is 1.45 to 1.67;

(b) adding water at a temperature of not lower than 90+° C. to the weighed powdery materials from step (a) to prepare an aqueous slurry containing the powdery materials;

(c) subjecting the aqueous slurry to a rotational attrition by using a ball mill to carry out a mechanochemical reaction of said calcium carbonate with said calcium monohydrogenphosphate or a dehydrate thereof;

(d) drying the aqueous slurry, thus mechanochemically reacted;

(e) pulverizing the dried slurry to obtain a powdery substance;

(f) calcining the powdery substance under conditions of calcination temperature and calcination period of time to obtain a biologically safe calcium phosphate free from all of hemolysis, antigenicity and cytotoxicity, said calcining being carried out at a calcination temperature of 720° to 1,150° C. for a calcination period of time of 1 to 10 hours, said calcining being carried out for a calcination period of time of at least one hour when said calcining is carried out at 1,150° C. and the calcination period of time being related to the calcination temperature such that the calcination period of time is increased with a decrease in said calcination temperature, said calcining being carried out for a calcination period of time of at least 3 hours when said calcining is carried out 1000° C., said calcining being carried out for a calcination period of time of at least 8 hours when said calcining is carried out at 900° C. and said calcining being carried out for a calcination period of time of at least 10 hours when said calcining is carried out at 720° C.;

(g) molding the calcium phosphate into a desired shape, and (h) sintering the molded calcium phosphate to obtain a sintered body of the calcium phosphate.

19. The method according to claim 18, wherein said powdery calcium carbonate has a particle diameter of not more than 0.5 μm.

20. The method according to claim 18, wherein the aqueous slurry contains about 10% by weight of the powdery materials.

* * * * *